(12) United States Patent
Mangal et al.

(10) Patent No.: US 12,307,179 B2
(45) Date of Patent: May 20, 2025

(54) DETECTING SIMULATION, EMULATION AND PROTOTYPING ISSUES USING STATIC ANALYSIS TOOLS

(71) Applicant: Synopsys, Inc., Mountain View, CA (US)

(72) Inventors: Mohan Mangal, Fremont, CA (US); Rohit Kumar Ohlayan, New Delhi (IN); Himanshu Kathuria, Fremont, CA (US); Jaskaran Singh Ajimal, Ludhiana (IN)

(73) Assignee: Synopsys, Inc., Sunnyvale, CA (US)

( * ) Notice: Subject to any disclaimer, the term of this patent is extended or adjusted under 35 U.S.C. 154(b) by 418 days.

(21) Appl. No.: 17/897,085

(22) Filed: Aug. 26, 2022

(65) Prior Publication Data
US 2023/0071521 A1    Mar. 9, 2023

(30) Foreign Application Priority Data
Aug. 27, 2021   (IN) .............................. 202141038923

(51) Int. Cl.
| | | |
|---|---|---|
| G06F 30/30 | (2020.01) | |
| G06F 30/327 | (2020.01) | |
| G06F 30/3308 | (2020.01) | |
| G06F 30/3315 | (2020.01) | |
| G06F 30/337 | (2020.01) | |
| G06F 115/06 | (2020.01) | |

(52) U.S. Cl.
CPC .......... *G06F 30/337* (2020.01); *G06F 30/327* (2020.01); *G06F 30/3308* (2020.01); *G06F 30/3315* (2020.01); *G06F 2115/06* (2020.01)

(58) Field of Classification Search
None
See application file for complete search history.

(56) References Cited

U.S. PATENT DOCUMENTS

| | | | | |
|---|---|---|---|---|
| 11,475,197 B2 * | 10/2022 | Coudert | ................... | G06F 30/33 |
| 2002/0087953 A1 * | 7/2002 | Hines | ...................... | G06F 9/465 |
| | | | | 714/E11.21 |

* cited by examiner

*Primary Examiner* — Leigh M Garbowski
(74) *Attorney, Agent, or Firm* — Fenwick & West LLP

(57) ABSTRACT

A system receives a specification of a circuit design for performing simulation of the circuit design. The specification includes one or more prototyping statements. A prototyping statement is processed by simulation of the circuit design. The system generates a netlist graph based on the specification of the circuit design. The system ignores the prototyping statements while generating the netlist graph. The system modifies the netlist graph to incorporate the prototyping statements of the specification. The netlist graph is modified by adding at least a net to the netlist graph based on a prototyping statement. The system performs static analysis based on the modified netlist graph.

20 Claims, 12 Drawing Sheets

DETECTING SIMULATION, EMULATION AND PROTOTYPING ISSUES USING STATIC ANALYSIS TOOLS

CROSS REFERENCE TO RELATED APPLICATION

This application claims the benefit of Indian Provisional Application No. 202141038923, filed Aug. 27, 2021, which is incorporated by reference in its entirety.

TECHNICAL FIELD

The present disclosure relates to static analysis of circuits in general and more specifically to processing hardware description language constructs using static analysis.

BACKGROUND

Circuit designers specify a circuit design using a hardware description language (HDL), for example, register transfer language (RTL). Different types of analyses of the circuit design are performed during the design flow of the circuit, for example, static analysis, simulation of the circuit, and so on. Static analysis identifies various RTL coding style issues in the circuit. Simulation of a circuit design is performed by providing inputs to the circuit and determining the signal at various nodes of the circuit design. The different types of analysis may be performed using different tools used during the electronic design automation (EDA) process. There are often differences between the representations of the circuit design used by different EDA tools. These mismatches can cause discrepancies between the different types of analyses performed using the circuit design.

SUMMARY

A system receives a specification of a circuit design for performing simulation of the circuit design. The specification includes one or more prototyping statements. A prototyping statement is processed by simulation of the circuit design. The system generates a netlist graph based on the specification of the circuit design. The system ignores the prototyping statements while generating the netlist graph. The system modifies the netlist graph to incorporate the prototyping statements of the specification. The netlist graph is modified by adding at least a net to the netlist graph based on a prototyping statement. The system performs static analysis based on the modified netlist graph.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

Figure (FIG.) 1 shows an example computing system for processing HDL prototyping statements according to an embodiment.

DETAILED DESCRIPTION

Figure 1:
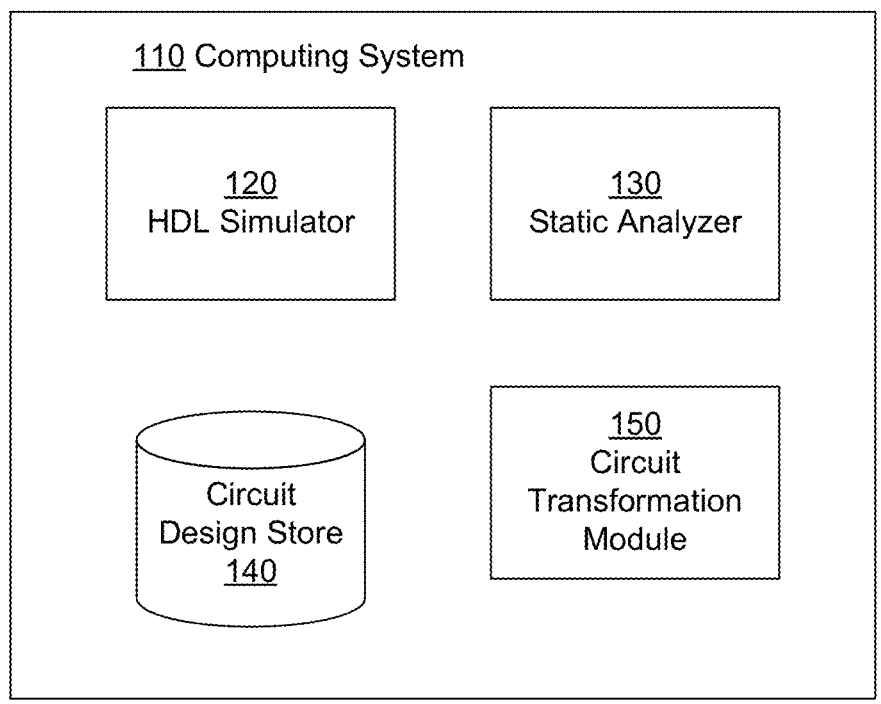

Circuit designers use a register transfer language (RTL) specification to perform tasks such as simulation of a circuit design. To facilitate the simulation process, circuit designers often use prototyping constructs that are processed by a hardware description language (HDL) simulator. Prototyping constructs are used to perform tasks such as assigning a signal from a node of a circuit module to a node of another circuit module. Such constructs are typically processed only by the simulators and are ignored by downstream stages of circuit design, for example, static analysis of the circuit design including linting of the specification of the circuit design to ensure that the circuit design is free of unsynthesizable constructs. As a result, there are differences between the circuit design that is simulated using a simulator and the circuit design that is processed by downstream tools of the EDA process such as static analysis tools. These mismatches cause discrepancies between the different circuit design phases of the EDA process resulting in errors in the generated circuit.

A prototyping construct is a construct used for making changes to the circuit design during the early design phase. For example, a circuit designer may force a particular signal at a particular node. Examples of such prototyping constructs that are used in simulation include force and release. For example, a force statement may be added to override a signal at a particular node of the circuit based on a signal from another node that may be present in a different circuit component. The release command represents instructions to stop overriding such signal of the particular node. Static analysis tools ignore these simulation constructs since these constructs are specific to tools performing simulation and the two types of tools are typically developed independent of each other and one tool may support features that are not supported by the other tool. This results in a disparity between the circuit design that is processed by simulators and the circuit design used for static analysis. Thus, design issues such as multiple drivers, hanging logic and so on that are found later in the design flow using downstream processing such as simulation, emulation, and prototyping. Addressing these design issues results in a large number of iterations in the design process.

The system according to various embodiments modifies the circuit design so that the equivalent circuit design that is processed by simulators matches the circuit design that is processed by static analysis tools. The system according to various embodiments receives a specification of a circuit design including prototyping statements. A prototyping statement is a construct that is processed by simulation of the circuit design but ignored by one or more stages of the EDA that perform static analysis of the circuit design. The system generates a netlist graph based on the specification of the circuit design. The system modifies the netlist graph to incorporate the prototyping statements of the specification, for example, by adding a net to the netlist graph based on a prototyping statement. The modifications to the circuit design ensure that circuit design used for simulation matches the circuit design used for the static analysis. The system performs static analysis of the modified netlist graph.

Aspects of the present disclosure allow circuit designers to use static analysis to find design issues in less runtime and early in the design cycle of an integrated circuit. Identifying design issues early in the design cycle makes the design process efficient and utilizes less computational resources as fewer iterations of the design process will be necessary.

FIG. 1 shows an example computing system for processing HDL prototyping statements according to an embodiment. A statement used in the specification of the circuit design may also be referred to herein as a construct or a command. For example, a force statement may be referred to as a force construct or a force command. The computing system 110 includes an HDL simulator 120, one or more static analyzers 130, a circuit design store 140, and a circuit transformation module 150. The circuit design store stores various representations of the circuit design. Examples of circuits for which the circuit design is processed include application-specific integrated circuits (ASICs). The circuit design may be specified using HDL, for example, VERILOG or VHDL. The HDL simulator 120 performs simulation of the circuit. For example, for a circuit design of an FPGA, the HDL simulator provides various combinations of input values and determines the output values. The static analyzer 130 performs various types of static analysis of the circuit design. Static analysis of a circuit design processes the circuit design, for example, the RTL representation of the circuit design to extract information about the circuit. An example of static analysis of a circuit design is static linting tool that performs structural analysis of the RTL representation of a circuit design to identify defects or errors in the circuit design. The static analyzer 130 may generate a report based on the static analysis, for example, a report describing the result of static linting.

Circuit designers such as FPGA integrators often specify the circuit design using constructs that are processed by HDL simulator 120, but not processed by circuit analyzer 130. Such signals include force statements based on cross module references (XMR), for example, a force statement that assigns signal of a node N1 of a circuit module M1 to a node N2 of a circuit module M2. These constructs may be used for debugging purposes for verification and simulation. As a result, when HDL annotated with HDL simulator commands is provided as input to circuit synthesis stages of the circuit design, these commands added for the HDL simulator get ignored, thereby resulting in functional failures. The reverse problem may happen when certain constructs are processed by the static analysis tools but not processed by the circuit simulators.

The circuit transformation module 150 analyzes the prototyping statements of the HDL simulator that are ignored by the circuit synthesis stages of the circuit design. The circuit transformation module 150 modifies the netlist generated by circuit synthesis such that the modified netlist conforms to the specification processed by the HDL simulator including the HDL simulator prototyping commands. As a result, the static analysis performed by the static analyzer 130 using the generated netlist is consistent with the results of the HDL simulator. The ability to process the HDL simulator constructs using static analysis allows the system to catch possible prototyping errors introduced during the HDL simulation phase using static analysis components such as static linters.

Certain constructs used by HDL simulators are not processed by circuit synthesis components. Examples of such constructs include cross module references (XMRs). XMRs are built into Verilog/System Verilog to globally reference (i.e., across the modules) any nets, tasks, functions and so on. Using XMR, a designer can refer to any object of a source module in any target module, irrespective of whether the object is present below or above its hierarchy. Hence, an XMR can be either a downward reference or an upward reference. These XMR statements are resolved by compilers such as Verilog compiler and simulator (VCS). If there are any issues while resolution, the compiler issues an error. These XMRs can be used in the right-hand side (RHS) or the left-hand side (LHS) expression or both.

Figure 2A:
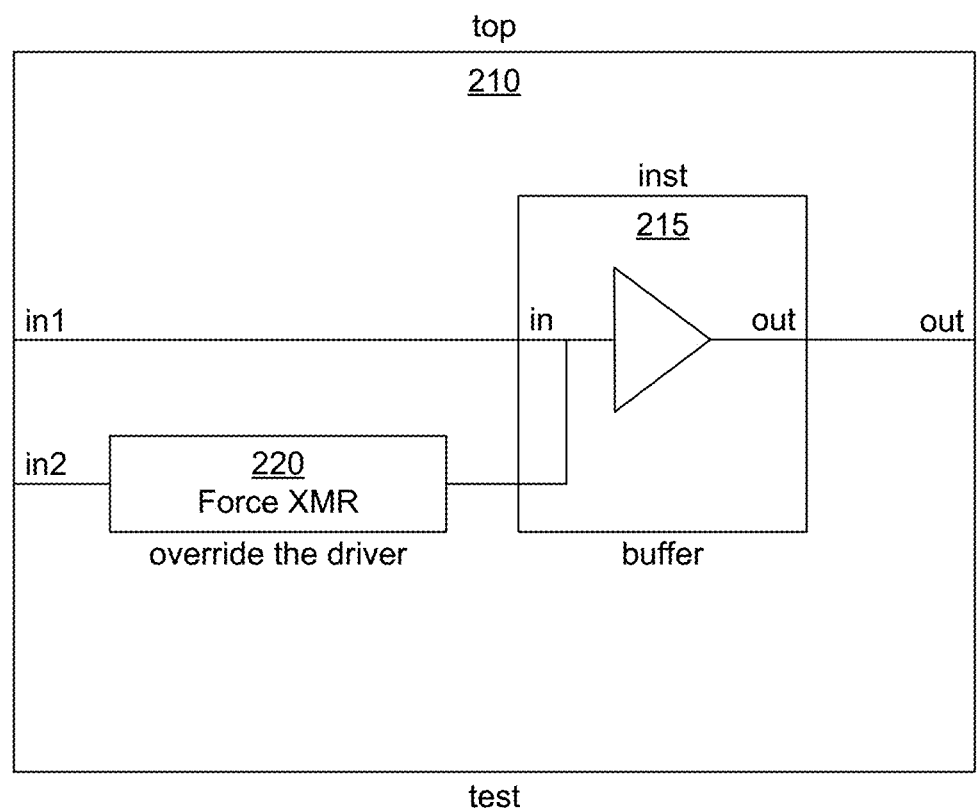
FIG. 2A shows an example netlist that uses a force XMR statement that overrides an existing driver in the circuit design.
Figure 2B:
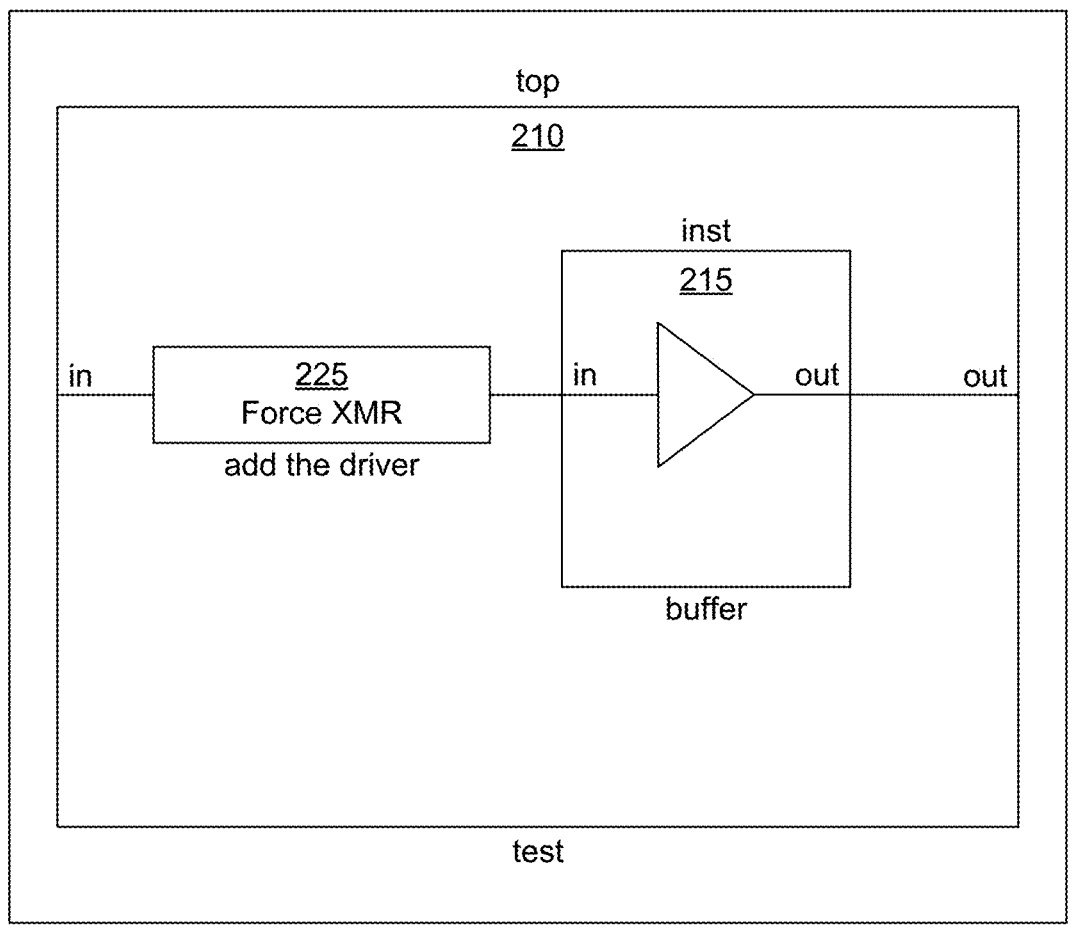
FIG. 2B shows an example netlist that uses a force XMR statement that drives an undriven terminal in the circuit design.
Figure 2C:
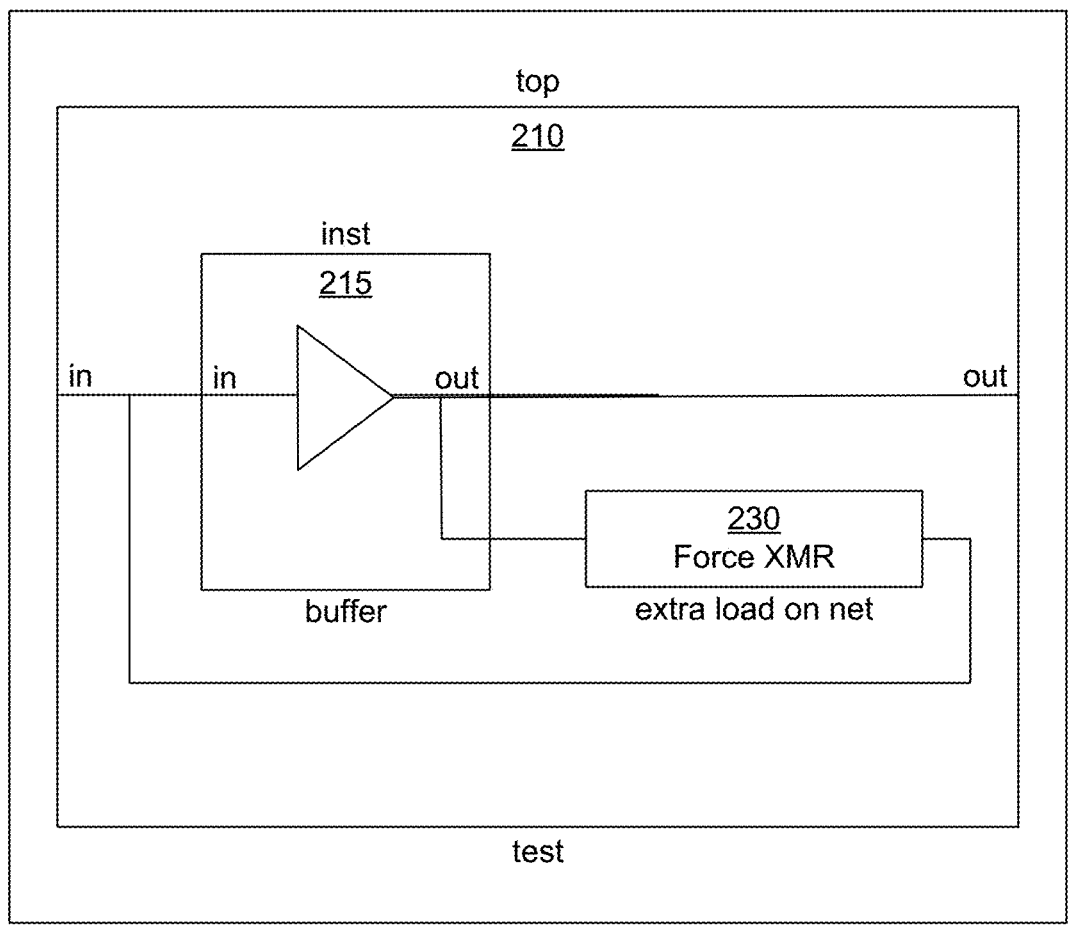
FIG. 2C shows an example netlist that uses a force XMR statement that adds a load on an existing net in the circuit design.

Using force statements with XMR is useful for debugging purpose for verification and simulation. Static analysis components do not support this construct. As a result, there is a simulation-synthesis mismatch since the circuit design as interpreted by the HDL simulator 120 is different from the circuit design as interpreted by the static analyzer 130 even though both the simulation operation and the static analysis operation are processing the same RTL representation of the circuit design. Using force statements with XMR eventually override/add either a driver or load to a net in the design. FIGS. 2A-C show examples of force statements using XMR.

FIG. 2A shows an example netlist of a circuit 200A that uses a force XMR statement that overrides an existing driver in the circuit design. In the example shown in FIG. 2A, XMR is used in a right-hand side of force statement. The RTL specification of the example netlist of FIG. 2A is as follows.

```
module test(input in1, in2, output out);
    initial force inst.in = in2;
    buffer inst(.in(in1), .out(out));
endmodule
module buffer(input in, output out);
    assign out = in;
endmodule
```

The circuit includes a test component 210 that includes a nested buffer component 215. The buffer component 215 has an input in and an output out. The RTL specification uses a force statement 220 to assign the input in of buffer component 215 to the in2 node of the test component 210. The XMR that references the node of a nested component is used on the left-hand side of the force command. FIG. 2A is an example, in which the force command assigns a signal of a node of a nested component to a signal of a higher level component to override an existing driver of the nested component. Since the static analyzer 130 ignores the force statement 220, the static analyzer processes the circuit such that the buffer component 215 has a single driver. In contrast, the HDL simulator 120 processes the force statement and processes the circuit 200A such that the buffer component 215 has multiple drivers.

FIG. 2B shows an example netlist of a circuit 200B that uses a force XMR statement that drives an undriven terminal in the circuit design. Accordingly, the circuit of FIG. 2B illustrates adding a driver to an existing net in the design by using XMR in the right-hand side of the force statement. Similar to circuit of FIG. 2A, the circuit of FIG. 2B includes the test component 210 that includes a nested buffer component 215. The RTL specification of the example netlist of FIG. 2B is as follows.

```
module test (input in, output out);
    initial force inst.in = in;
    buffer inst(.in( ), .out(out));
endmodule
module buffer(input in, output out);
    assign out = in;
endmodule
```

The RTL specification uses a force statement 225 to assign the input in of buffer component 215 to the node in of the test component 210. The XMR that references the node of a nested component is used on the left-hand side of the force command. Since the static analyzer 130 ignores the force statement 225, the static analyzer processes the circuit such that the buffer component 215 has an undriven input terminal for inst.in. In contrast, the HDL simulator 120 processes the force statement and processes the circuit 200A such that the buffer component 215 has no undriven input terminal.

FIG. 2C shows an example netlist of a circuit 200C that uses a force XMR statement that adds a load on an existing net in the circuit design. The RTL specification of the example netlist of FIG. 2C is as follows. The force statement 230 creates a loop by providing the output out of the buffer component 215 as the input in of the buffer component 215.

```
module test(input in, output out);
    initial force in = inst.out;
    buffer inst(.in(in), .out(out));
endmodule
module buffer(input in, output out);
    assign out = in;
endmodule
```

The circuit shown in FIG. 2C illustrates adding an additional load on the existing net in the design when XMR is used in the left-hand side of the force statement. Since the static analyzer 130 ignores the force statement 230, the static analyzer processes the circuit such that there is no combinational loop present in the circuit design. In contrast, the HDL simulator 120 processes the force statement and processes the circuit 200A such that there is a combinational loop present in the design from in->inst.in->inst.out->in.

The system according to various embodiments detects some of these coding style issues which can cause mismatches between pre-synthesis and post-synthesis simulations. The system identifies overriding assignment issues caused by force statements using XMR for above examples mentioned in FIGS. 2A-C. The system does not require any extra input from the user for static analysis. The same input RTL ASIC design may be processed to analyze and reduce mismatches between pre-synthesis and post-synthesis simulations.

Figure 3:
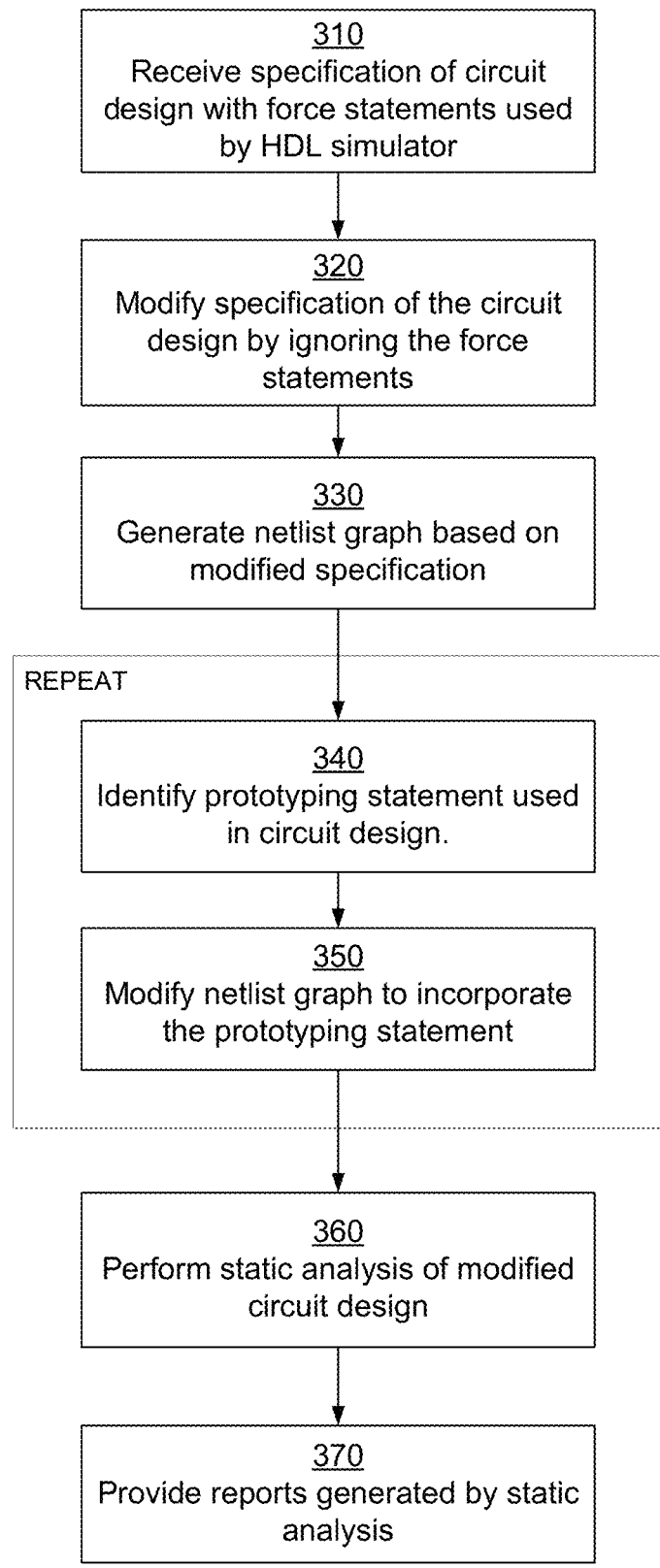
FIG. 3 is the overall process for incorporating prototyping statements into static analysis of circuit design according to an embodiment.

FIG. 3 is the overall process for incorporating prototyping statements into static analysis of circuit design according to an embodiment. The process is described as being executed by a system, for example, the computing system 110 or computer system 800 and is executed by components of the system. The process illustrated in FIG. 3 receives a specification of a circuit design, for example, RTL specification and performs analysis, for example, static analysis to generate one or more reports based on the analysis. The system modifies the circuit design to handle any prototyping statements included in the specification, thereby removing the gap between simulation and synthesis or static analysis of the circuit design.

The system receives 310 a specification S1 of a circuit design, for example, an RTL specification. The specification S1 is included for processing by an HDL simulator, and includes one or more prototyping statements, for example, force statements. The system identifies all the prototyping statements that are included for use by the HDL simulator. According to an embodiment, the system stores the list of different types of prototyping statements. The system parses the RTL specification and matches the statements of the RTL specification against the stored list of types of prototyping statements. If a statement of the RTL specification matches a type of prototyping statements, the system marks that statement as a prototyping statement. The system may store these force XMR statements in a database. The system modifies 320 the specification by removing the prototyping statements to obtain a modified specification S2. The system generates 330 a netlist graph representing the circuit design based on the specification S2.

The system repeats the steps 340 and 350 for each prototyping statement that was identified in the specification S1. The system identifies 340 a prototyping statement of the specification S1. The system modifies 350 the netlist graph to incorporate the identified prototyping statement.

The system performs 360 static analysis, for example, using a static linter of the circuit design represented by the modified netlist graph. The static analysis may perform rule checking on the modified synthesized graph. All the checks (rules) in static analysis tool find the extra edges in synthesized graph. This way, all the static analysis checks work properly in accordance with the HDL simulation. The system may generate a report based on the static analysis, for example, a linting report. The system provides 370 the generated report to a user, for example, a circuit designer.

Figure 4:
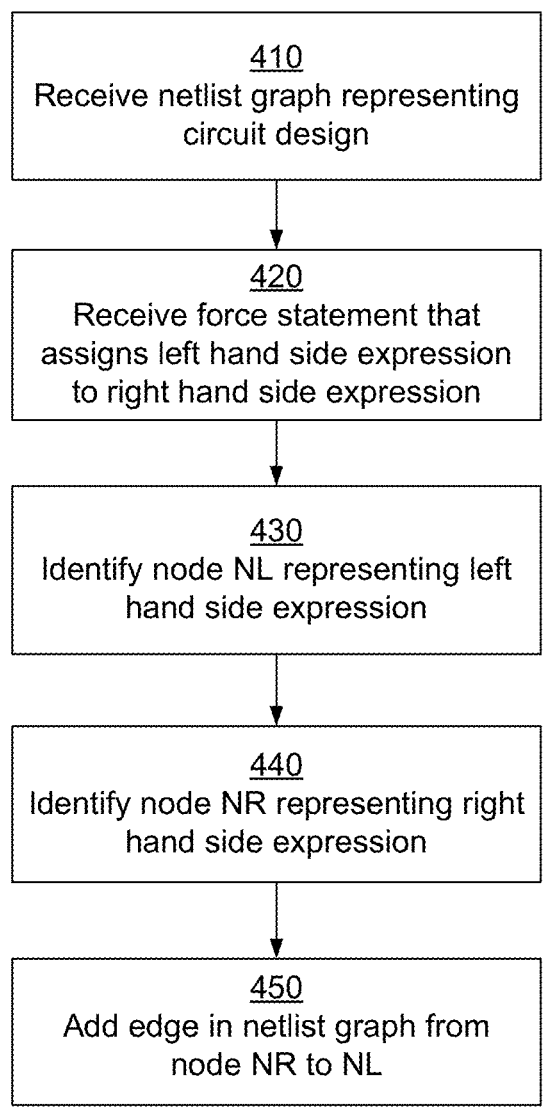
FIG. 4 illustrates operations for modifying a netlist to incorporate a prototyping statement according to an embodiment.

FIG. 4 is the details of the steps for modifying a netlist to incorporate a prototyping statement according to an embodiment. Accordingly, the process illustrated in FIG. 4 shows the details of the step 350 of the process shown in FIG. 3.

The system receives 410 a netlist graph representing the circuit design. The netlist graph may have been previously modified to incorporate one or more other prototyping statements, for example, force statements. The system further receives 420 a new prototyping statement for incorporating in the netlist graph. According to an embodiment, the prototyping statement is a force statement that includes a left-hand side expression L that is assigned to a right-hand side expression R. The system identifies 430 a circuit node NL corresponding to the left-hand side expression L. The system identifies 440 a circuit node NR corresponding to the right-hand side expression R. The system adds 450 an edge in the netlist graph from node NR corresponding to the right-hand side expression R of the force statement to node NL corresponding to the left-hand side expression L of the force statement. The modification of the circuit design to incorporate the force statements is illustrated using the examples of FIGS. 2A-C.

Figure 5A:
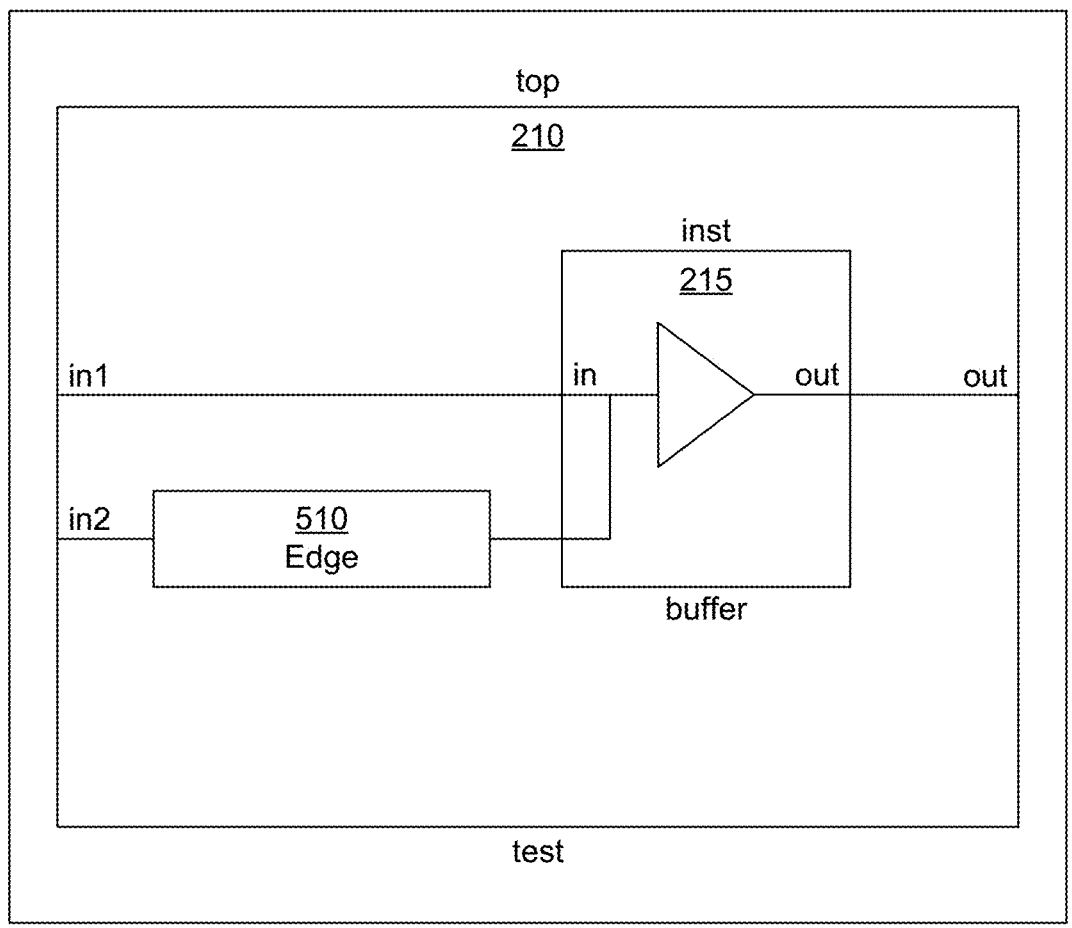
FIG. 5A shows an example netlist generated by the process illustrated in FIG. 4 for processing a prototyping statement illustrated in FIG. 2A according to an embodiment.

FIG. 5A shows an example netlist generated by the process of FIG. 4 for processing a prototyping statement illustrated in FIG. 2A according to an embodiment. The edge 510 is included from the node in2 of test component corresponding to the right-hand side of the force statement 220 to the node in of the buffer component corresponding to the left-hand side of the force statement 220.

Figure 5B:
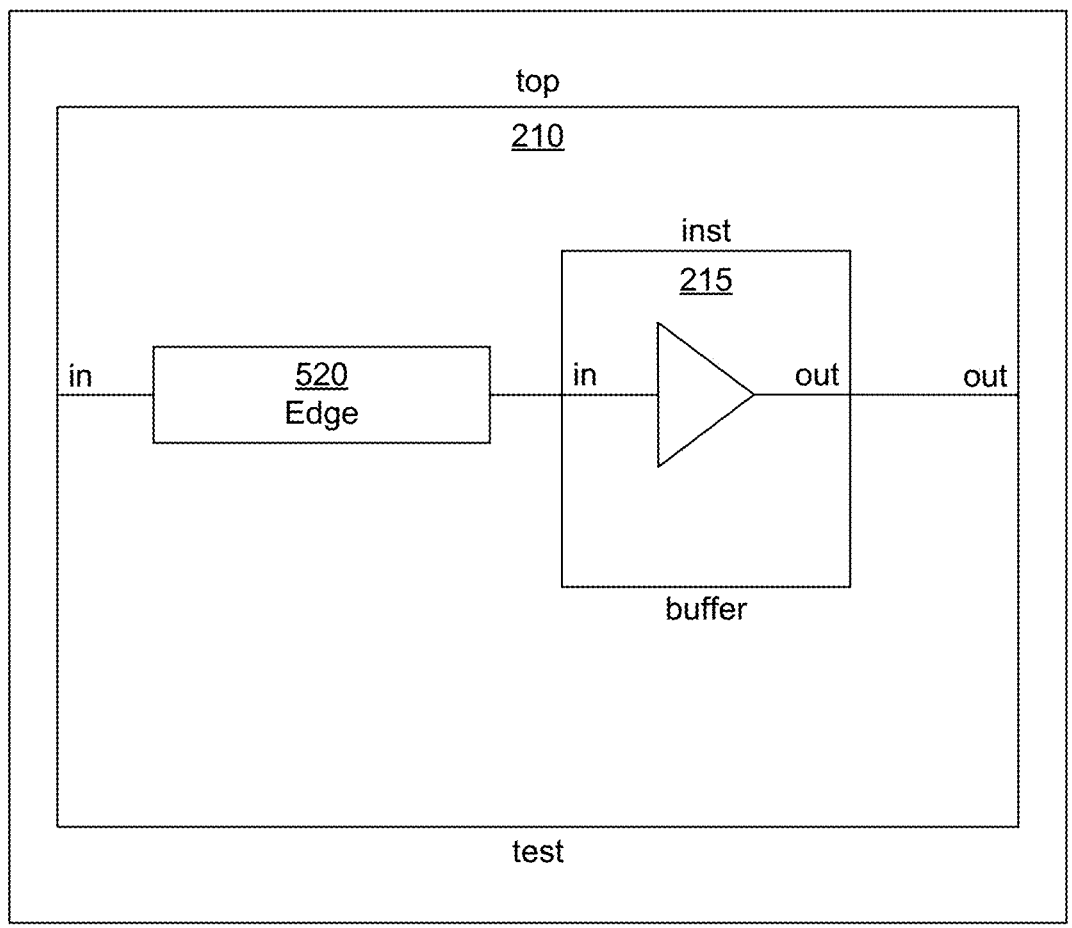
FIG. 5B shows an example netlist generated by the process illustrated in FIG. 4 for processing a prototyping statement illustrated in FIG. 2B according to an embodiment.

FIG. 5B shows an example netlist generated by the process illustrated in FIG. 4 for processing prototyping statement illustrated in FIG. 2B according to an embodiment. The edge 520 is included from the node in of test component corresponding to the right-hand side of the force statement 225 to the node in of the buffer component corresponding to the left-hand side of the force statement 225.

Figure 5C:
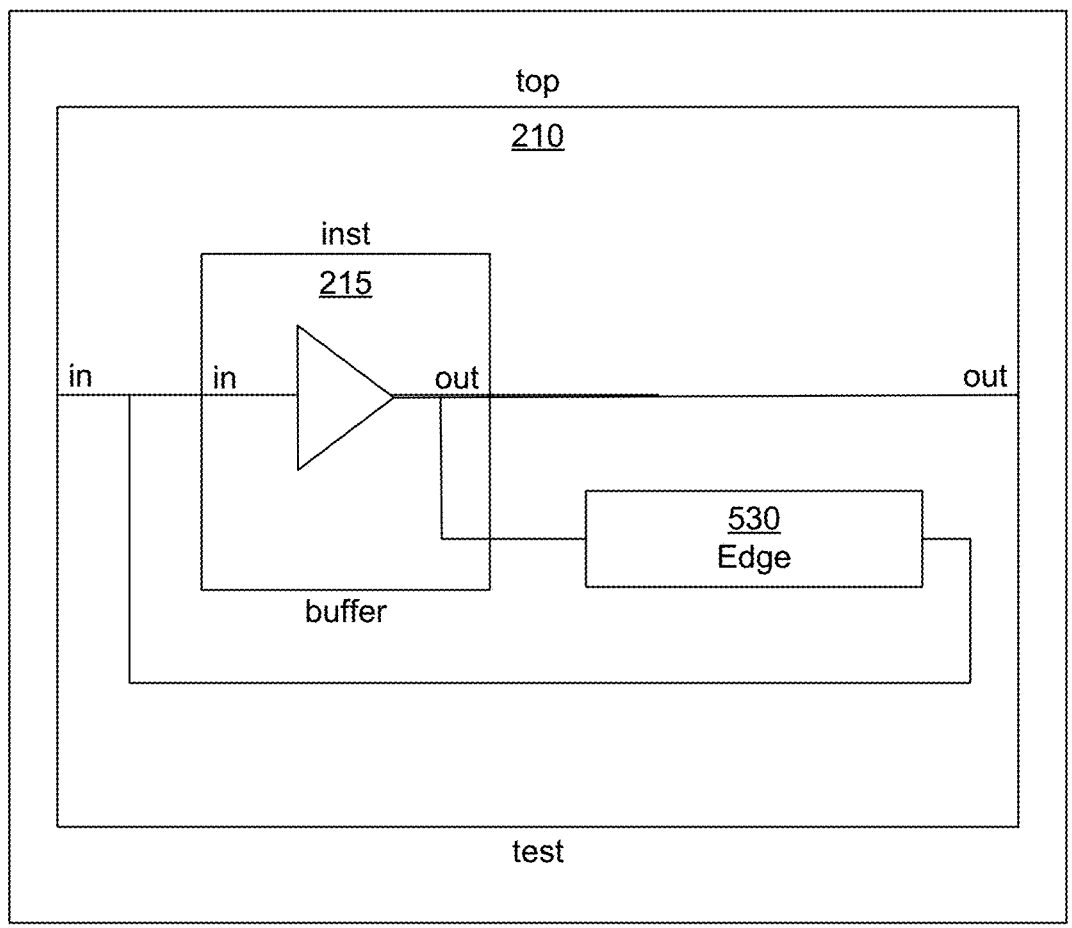
FIG. 5C shows an example netlist generated by the process illustrated in FIG. 4 for processing a prototyping statement illustrated in FIG. 2C according to an embodiment.

FIG. 5C shows an example netlist generated by the process illustrated in FIG. 4 for processing prototyping statement illustrated in FIG. 2C according to an embodiment. The edge 530 is included from the node out of buffer component corresponding to the right-hand side of the force statement 230 to the node in of the buffer component corresponding to the left-hand side of the force statement 230.

The system according to various embodiments reports different kinds of errors that may not be reported without the use of the techniques disclosed. For example, the system reports issues when force assign statements are used on equivalent nets but present in different modules. This can help user to avoid using a force statement on the same net.

Aspects of the present disclosure improve the quality of static analysis and provide better results to designers to fix the bad coding style issues in RTL. This helps in reporting and resolving different kinds of issues in RTL including combination loops (as illustrated in FIGS. 2C and 5C), multiple drivers (as illustrated in FIGS. 2A and 5A), and hanging nets (as illustrated in FIGS. 2B and 5B), and false violations that may be reported by static analysis tools. A combination loop in a circuit is formed when the input of a component is generated based on an output of the component without involving a sequential gate along the path. Multiple drivers are formed in a circuit design when two or more drivers are providing input to a component. A hanging net is formed when no signal is provided to a node of the circuit.

The following is an example circuit specification that illustrates the reports that may be generated based on analysis performed by the system as disclosed:

```
module top(input in1, in2, output out);
   initial force u1.in = in1;
   initial force u1.u2.in = in2;
   sub1 u1 (.in(1'b1), .out(out));
endmodule
module sub1(input in, output out);
   sub2 u2(.in(in), .out(out));
endmodule
module sub2(input in, output out);
   assign out = in;
```

```
endmodule
```

Below is the sample report output generated based on the analysis performed using the processes disclosed herein.

| Msg Id: | Violation Message |
| --- | --- |
| 1 | Signal u1/in has driver via Force/Assign statement in1. Same/Equivalent signal u1/u2/in has driver via another Force/Assign statement in2 |
| 2 | Signal u1.u2.in has conflicting drivers with force statement driver in2 and regular connection driver 1 |
| 2 | Signal u1.in has conflicting drivers with force statement driver in1 and regular connection driver 1 |

TABLE 1 shows the comparison data where a static checker can warn upfront about the potential issues in the equivalence checker without the disclosed system. As shown, the system as disclosed is able to detect more issues compared to a system that does not implement the processes disclosed herein.

TABLE 1

| Design | Equivalence checker without disclosed system (total count) | Detection of potential faulty end points (total count) |
| --- | --- | --- |
| D1 | 2452 | 2732 |
| D2 | 256 | 327 |
| D3 | 1535 | 1735 |

Figure 6:
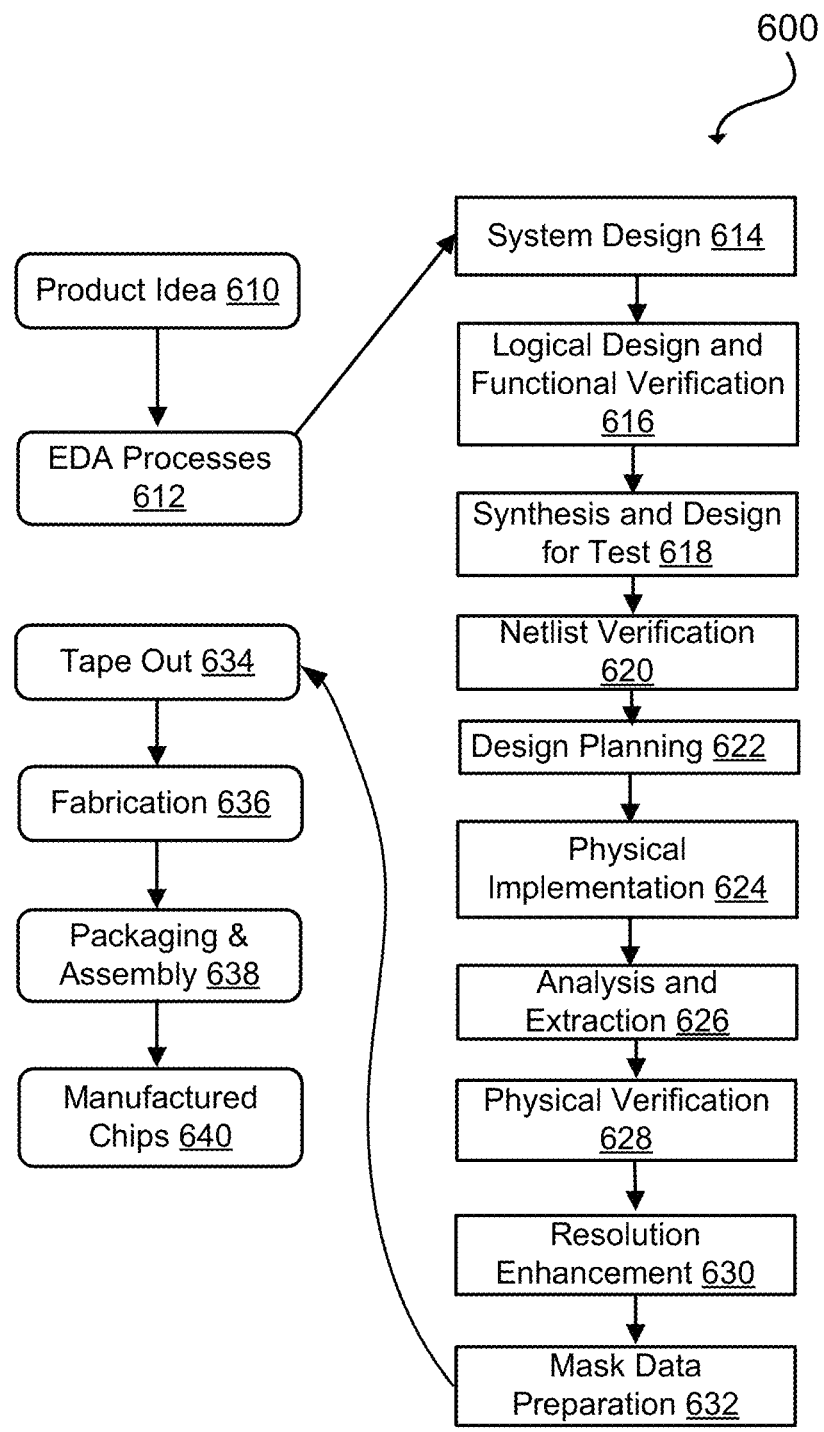
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tapeout, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a concrete description adds more useful detail into the design description, for example, more details for the modules that include the description. The lower levels of representation that are concrete descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 6. The processes described by be enabled by EDA products (or tools).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system may be used to store the programs and data structures that are used by some or all of the EDA products described herein, and products used for development of cells for the library and for physical and logical design that use the library.

Figure 7:
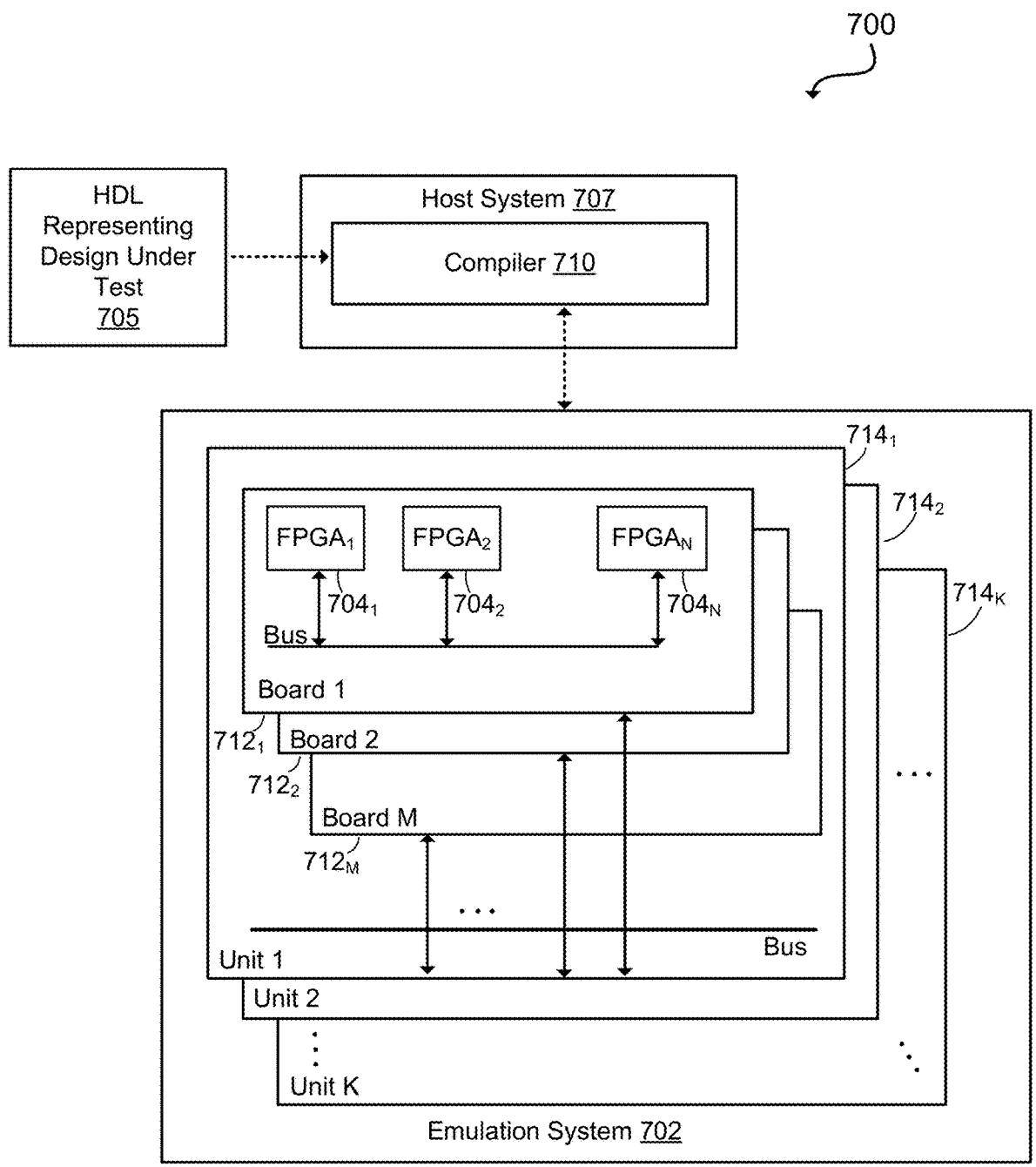
FIG. 7 depicts a diagram of an example emulation system in accordance with some embodiments of the present disclosure.

FIG. 7 depicts a diagram of an example emulation environment 700. An emulation environment 700 may be configured to verify the functionality of the circuit design. The emulation environment 700 may include a host system 707 (e.g., a computer that is part of an EDA system) and an emulation system 702 (e.g., a set of programmable devices such as Field Programmable Gate Arrays (FPGAs) or processors). The host system generates data and information by using a compiler 710 to structure the emulation system to emulate a circuit design. A circuit design to be emulated is also referred to as a Design Under Test ('DUT') where data and information from the emulation are used to verify the functionality of the DUT.

The host system 707 may include one or more processors. In the embodiment where the host system includes multiple processors, the functions described herein as being performed by the host system can be distributed among the multiple processors. The host system 707 may include a compiler 710 to transform specifications written in a description language that represents a DUT and to produce data (e.g., binary data) and information that is used to structure the emulation system 702 to emulate the DUT. The compiler 710 can transform, change, restructure, add new functions to, and/or control the timing of the DUT.

The host system 707 and emulation system 702 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 707 and emulation system 702 can exchange data and information through a third device such as a network server.

The emulation system 702 includes multiple FPGAs (or other modules) such as FPGAs $704_1$ and $704_2$ as well as additional FPGAs to $704_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 702 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $704_1$-$704_N$ may be placed onto one or more boards $712_1$ and $712_2$ as well as additional boards through $712_M$. Multiple boards can be placed into an emulation unit $714_1$. The boards within an emulation unit can be connected using the backplane of the emulation unit or any other types of connections. In addition, multiple emulation units (e.g., $714_1$ and $714_2$ through $714_K$) can be connected to each other by cables or any other means to form a multi-emulation unit system.

For a DUT that is to be emulated, the host system 707 transmits one or more bit files to the emulation system 702. The bit files may specify a description of the DUT and may further specify partitions of the DUT created by the host system 707 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 707 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 707 and/or the compiler 710 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 705 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 8:
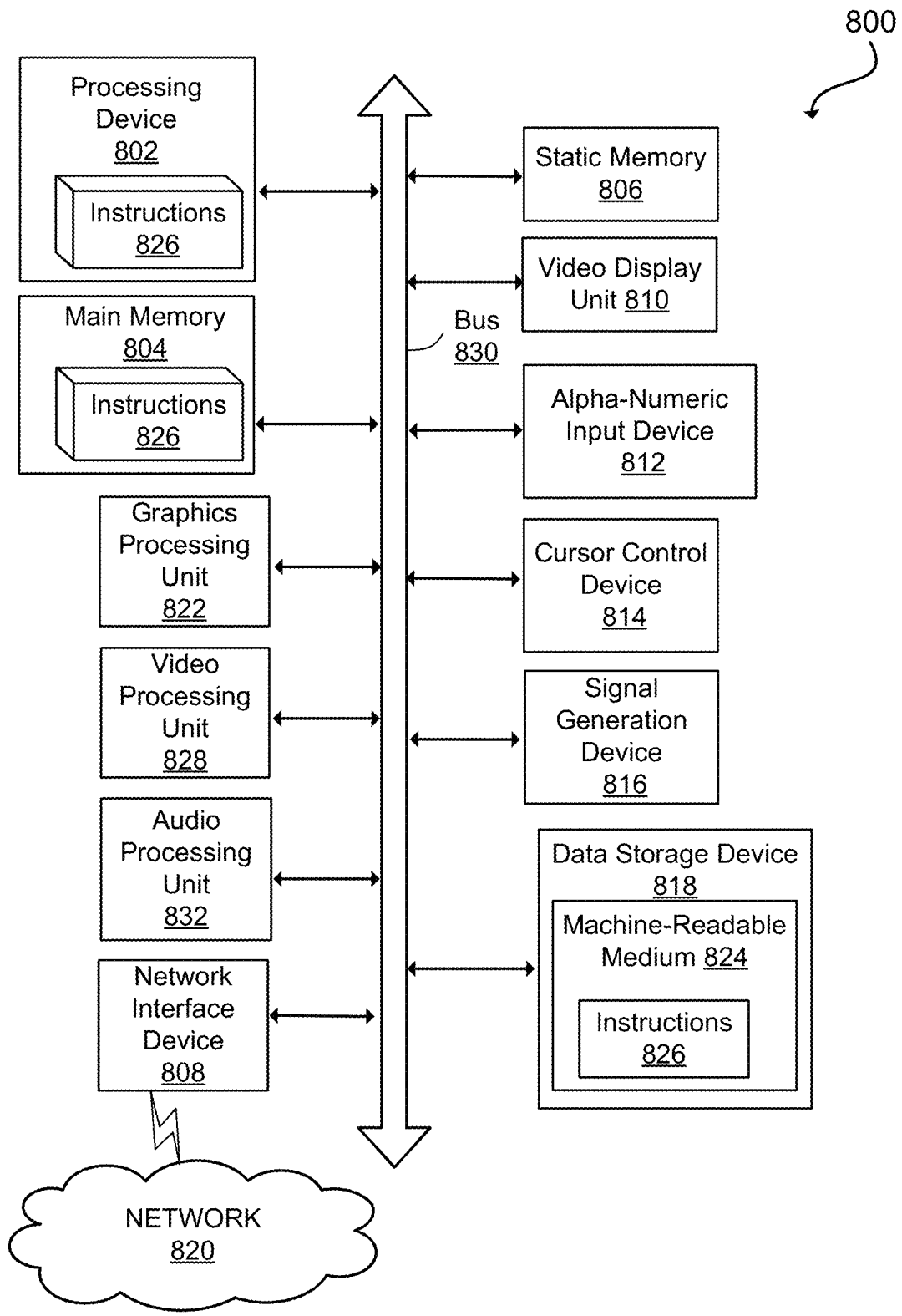
FIG. 8 depicts a diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked)

to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving a specification of a circuit design for performing simulation of the circuit design, the specification including one or more prototyping statements, wherein the one or more prototyping statements are processed by a simulation of the circuit design;
   generating a netlist graph based on the specification of the circuit design, wherein the one or more prototyping statements are ignored while generating the netlist graph;
   modifying the netlist graph according to the one or more prototyping statements of the specification, wherein the netlist graph is modified by adding at least a net to the netlist graph based on a prototyping statement from the one or more prototyping statements; and
   performing, by a processing device, static analysis based on the netlist graph modified according to the prototyping statement from the one or more prototyping statements.

2. The method of claim 1, wherein the prototyping statement is a force statement that assigns a signal from a source node of a source circuit module to a target node of a target circuit module.

3. The method of claim 2, wherein the source node is specified using a right-hand side expression and the target node is specified using a left-hand side expression, wherein the force statement assigns the right-hand side expression to the left-hand side expression.

4. The method of claim 2, wherein modifying the netlist graph comprises:
   determining the source node of the source circuit module specified by the force statement; and
   determining the target node of the target circuit module specified by the force statement,
   wherein the net added to the netlist graph provides a signal of the source node to the target node.

5. The method of claim 1, wherein the specification of the circuit design processed by the simulation is specified using a register transfer language (RTL).

6. The method of claim 1, wherein the static analysis generates a report that incorporates changes to the circuit design performed using the one or more prototyping statements.

7. The method of claim 1, further comprising, using the static analysis to identify one or more issues with an RTL representation of the circuit design, including:
   combination loops;
   multiple drivers; and
   hanging nets.

8. A non-transitory computer readable medium comprising stored instructions, which when executed by a processor, cause the processor to perform steps that cause the processor to:
   receive a specification of a circuit design for performing simulation of the circuit design, the specification including one or more prototyping statements, wherein the one or more prototyping statements are processed by a simulation of the circuit design;
   generate a netlist graph based on the specification of the circuit design, wherein the one or more prototyping statements are ignored while generating the netlist graph;
   modify the netlist graph according to the one or more prototyping statements of the specification, wherein the netlist graph is modified by adding at least a net to the netlist graph based on a prototyping statement from the one or more prototyping statements; and
   perform, by a processing device, static analysis based on the netlist graph modified according to the prototyping statement from the one or more prototyping statements.

9. The non-transitory computer readable medium of claim 8, wherein the prototyping statement is a force statement that assigns a signal from a source node of a source circuit module to a target node of a target circuit module.

10. The non-transitory computer readable medium of claim 9, wherein the source node is specified using a right-hand side expression and the target node is specified using a left-hand side expression, wherein the force statement assigns the right-hand side expression to the left-hand side expression.

11. The non-transitory computer readable medium of claim 9, wherein instructions for modifying the netlist graph cause the processor to:
    determine the source node of the source circuit module specified by the force statement; and
    determine the target node of the target circuit module specified by the force statement,
    wherein the net added to the netlist graph provides a signal of the source node to the target node.

12. The non-transitory computer readable medium of claim 8, wherein the specification of the circuit design processed by the simulation is specified using a register transfer language (RTL).

13. The non-transitory computer readable medium of claim 8, wherein the static analysis generates a report that incorporates changes to the circuit design performed using the one or more prototyping statements.

14. The non-transitory computer readable medium of claim 8, wherein the stored instructions further cause the computer processor to, using the static analysis to identify one or more issues with an RTL representation of the circuit design, including:
    combination loops;
    multiple drivers; and
    hanging nets.

15. A system comprising:
    a memory; and
    a processor, coupled with the memory, to:
      receive a specification of a circuit design for performing simulation of the circuit design, the specification including one or more prototyping statements, wherein the one or more prototyping statements are processed by a simulation of the circuit design;

generate a netlist graph based on the specification of the circuit design, wherein the one or more prototyping statements are ignored while generating the netlist graph;

modify the netlist graph according to the one or more prototyping statements of the specification, wherein the netlist graph is modified by adding at least a net to the netlist graph based on a prototyping statement from the one or more prototyping statements; and perform static analysis based on the netlist graph modified according to the prototyping statement from the one or more prototyping statements.

16. The system of claim 15, wherein the prototyping statement is a force statement that assigns a signal from a source node of a source circuit module to a target node of a target circuit module.

17. The system of claim 16, wherein the source node is specified using a right-hand side expression and the target node is specified using a left-hand side expression, wherein the force statement assigns the right-hand side expression to the left-hand side expression.

18. The system of claim 16, wherein instructions for modifying the netlist graph cause the computer processor to:
determine the source node of the source circuit module specified by the force statement; and
determine the target node of the target circuit module specified by the force statement,
wherein the net added to the netlist graph provides a signal of the source node to the target node.

19. The system of claim 15, wherein the static analysis generates a report that incorporates changes to the circuit design performed using the one or more prototyping statements.

20. The system of claim 15, wherein the stored instructions further cause the computer processor to, using the static analysis to identify one or more issues with an RTL representation of the circuit design, including:
combination loops;
multiple drivers; and
hanging nets.

* * * * *